United States Patent
Rivera, Jr. et al.

(10) Patent No.: US 9,738,116 B1
(45) Date of Patent: Aug. 22, 2017

(54) MOBILE FOLDING RESTAURANT BOOTH STYLE BENCH

(71) Applicant: AmTab Manufacturing Corporation, Aurora, IL (US)

(72) Inventors: Jeremias C. Rivera, Jr., Elmhust, IL (US); Doss Samikkannu, Des Plaines, IL (US)

(73) Assignee: AMTAB MANUFACTURING CORPORATION, Aurora, IL (US)

(*) Notice: Subject to any disclaimer, the term of this patent is extended or adjusted under 35 U.S.C. 154(b) by 0 days.

(21) Appl. No.: 15/048,596

(22) Filed: Feb. 19, 2016

(51) Int. Cl.
| | |
|---|---|
| *A47B 83/02* | (2006.01) |
| *B60B 33/06* | (2006.01) |
| *A47C 7/56* | (2006.01) |
| *A47C 11/00* | (2006.01) |
| *A47F 10/06* | (2006.01) |
| *A47C 7/00* | (2006.01) |
| *B60B 33/00* | (2006.01) |
| *A47C 7/60* | (2006.01) |

(52) U.S. Cl.
CPC ............ *B60B 33/063* (2013.01); *A47B 83/02* (2013.01); *A47C 7/006* (2013.01); *A47C 7/566* (2013.01); *A47C 7/60* (2013.01); *A47C 11/00* (2013.01); *A47F 10/06* (2013.01); *B60B 33/006* (2013.01)

(58) Field of Classification Search
CPC ......... A47B 83/02; A47C 7/566; A47C 7/006; A47C 7/60; A47C 11/00; A47F 10/06
USPC .................................. 297/157.1–159.1, 332
See application file for complete search history.

(56) References Cited

U.S. PATENT DOCUMENTS

| | | | | |
|---|---|---|---|---|
| 3,028,197 A | * | 4/1962 | Wilson .................... | A47B 3/14 297/124 |
| 3,061,369 A | * | 10/1962 | Haunost ................. | A47B 85/04 297/124 |
| 3,337,262 A | * | 8/1967 | Katzfey ................... | A47B 3/14 297/158.4 X |
| 3,594,037 A | * | 7/1971 | Sherman ................ | A47C 1/036 297/14 |
| 3,715,143 A | * | 2/1973 | Gerken ................... | A47B 3/14 297/158.4 X |

(Continued)

*Primary Examiner* — Rodney B White
(74) *Attorney, Agent, or Firm* — Hinshaw & Culbertson LLP

(57) ABSTRACT

Mobile folding restaurant booth style benches are provided, which may be arranged in opposed pairs to form restaurant style booths. An individual bench incorporates a mechanism for shifting the weight of the bench between a mobile base, which may be supported by swivel casters, and a stationary base, which may be supported by non-slip feet, actuated by pivoting a bench seat down from a folded storage position to an unfolded seating position. The weight shifting mechanism may include an engagement member, which is initially spaced apart from an actuator at a folded angle of the seat, and which contacts and begins transmitting force and movement to the actuator at a partially unfolded angle of the seat. Preferably, the bench further includes a biasing component that biases the stationary base upward relative to the mobile base, a locking mechanism that resists a force provided by the biasing component to retain the bench seat in the unfolded seating position, contoured shells or other covers for the seat and a seat back, and a back panel extending vertically above the seat back.

19 Claims, 10 Drawing Sheets

(56) References Cited

U.S. PATENT DOCUMENTS

| | | | | |
|---|---|---|---|---|
| 4,606,575 A * | 8/1986 | Kodet | ............... | A47B 83/02 |
| | | | | 108/133 |
| 4,949,649 A * | 8/1990 | Terres | ............... | E04H 3/28 |
| | | | | 108/116 |
| 5,349,789 A * | 9/1994 | Andert | ............... | E04H 3/126 |
| | | | | 52/7 |
| 5,392,718 A * | 2/1995 | Stevens | ............... | E04H 3/28 |
| | | | | 108/167 |
| 5,615,451 A * | 4/1997 | Peterson | ............... | B60B 33/06 |
| | | | | 16/34 |
| 7,226,125 B2 * | 6/2007 | Frobose | ............... | A47B 3/14 |
| | | | | 297/158.4 X |
| 7,469,966 B1 * | 12/2008 | Vallee | ............... | A47C 1/121 |
| | | | | 297/146 |
| 8,182,032 B2 * | 5/2012 | Dickey | ............... | A47B 3/14 |
| | | | | 297/157.1 |
| 8,820,826 B2 * | 9/2014 | Dickey | ............... | A47B 3/14 |
| | | | | 297/158.4 X |
| 9,370,265 B2 * | 6/2016 | Whittington | ............... | A47F 10/06 |
| 2008/0116724 A1 * | 5/2008 | Dickey | ............... | A47B 3/14 |
| | | | | 297/158.4 |

* cited by examiner

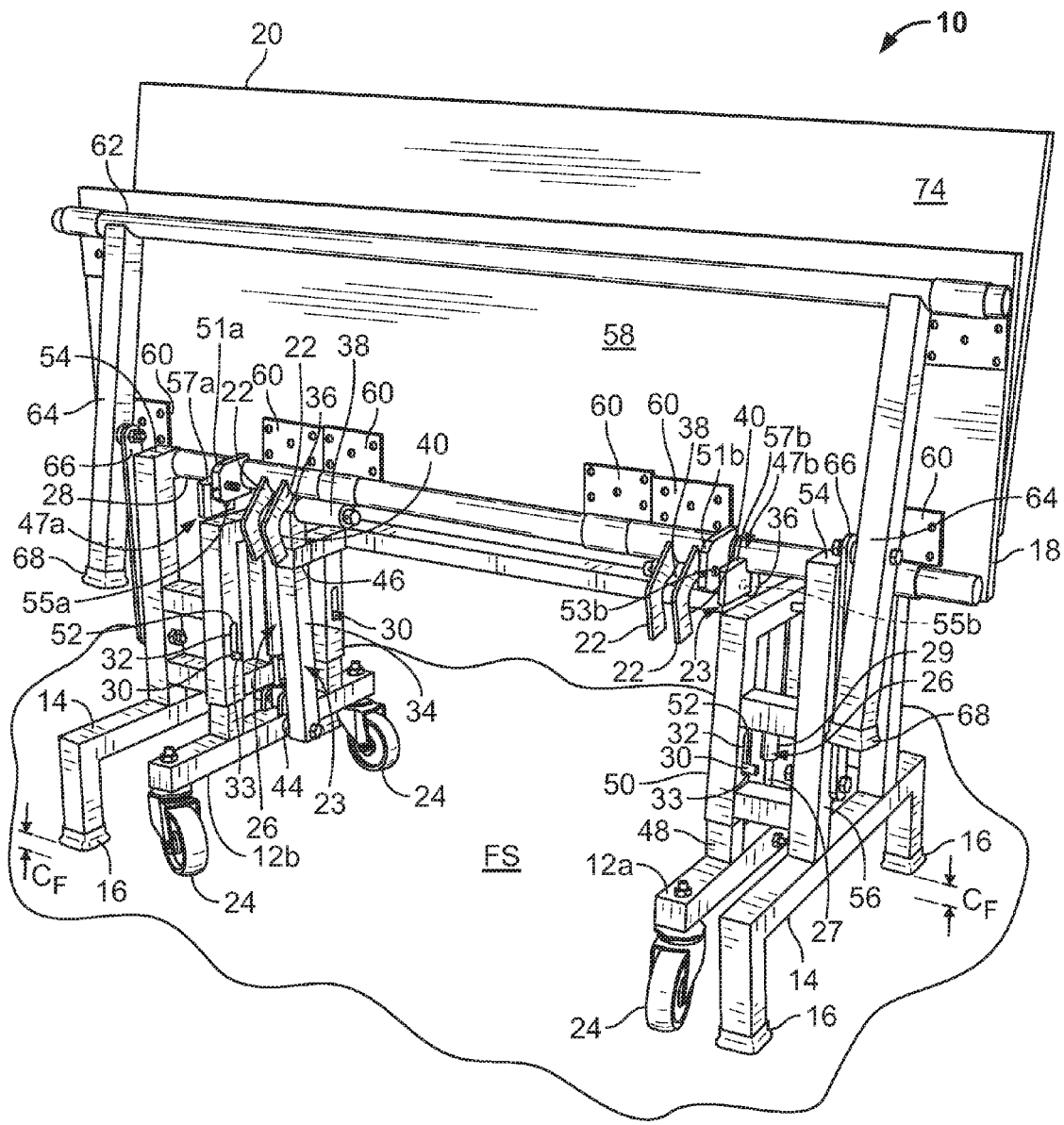
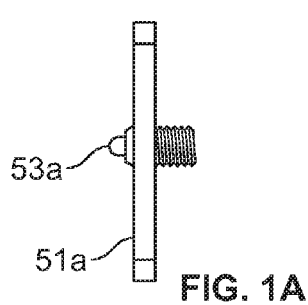
FIG. 1A
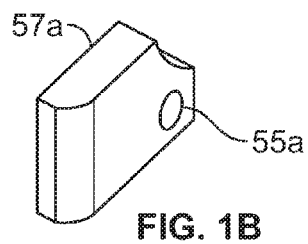
FIG. 1B
FIG. 1

MOBILE FOLDING RESTAURANT BOOTH STYLE BENCH

FIELD OF THE INVENTION

The present invention relates to mobile bench seating and, more particularly, to mobile bench seating styled such that opposed pairs of bench seating units arranged with a table between them resemble a typical restaurant booth.

BACKGROUND

Many people enjoy booth style seating. Compared to a table with individual movable or attached stools or chairs, booth style seating can provide comfort and create intimacy in a public setting, with its typical wide, contoured or cushioned seats, high seat backs, and frequently a privacy panel extending above the top of the seat backs. Thus, booth seating is commonly included in the customer dining/lounge areas of restaurants, bars, coffee shops, and the like. However, booth style seating has been traditionally less common in school cafeterias and other institutional settings, where demands of mobility, efficient storage, and ease of cleaning often outweigh concerns regarding comfort and intimacy. Due to high seat backs, privacy panels, and the prevalence of unused bench surface between occupants which would otherwise be empty space between individual chairs or stools, booth seating is typically more bulky and heavier than individual seating, making it more difficult to move and store. Moreover, in addition to immobility, the typical positioning of booth seating next to a wall compounds the difficulty of cleaning on, around, and under booths.

A need therefore exists for a booth style bench that can provide comfort and privacy without sacrificing mobility, space-efficient storage, and ease of cleaning.

SUMMARY OF THE INVENTION

According to an aspect of the invention, a mobile folding bench is provided, which converts between a mobile folded storage position and a stationary unfolded seating position simply by pivoting a seat between the two positions. The bench comprises a generally vertically oriented seat back comprising a forward facing seat back surface configured to support the back of a sitting human occupant; a seat comprising a sitting surface configured to seat the human occupant, the seat disposed in front of the seat back; a mobile base comprising at least one mobile floor surface contacting support member; a stationary base comprising at least one stationary floor surface contacting support member; the seat back being supported by at least one of the mobile base and the stationary base; a base biasing member connected between the mobile base and the stationary base and biasing the stationary base in a generally upward direction relative to the mobile base; and a base lifting member operatively connected to the seat and configured to transmit a lifting force to the stationary base to lift the mobile base relative to the stationary base when the seat is moved from the folded position to the seating position, so that the folding bench is supported on the floor surface by the stationary support member. The mobile floor surface contacting support member may be any support member configured to facilitate lateral movement across a floor surface, such as a glide or swivel caster. The stationary base is movably coupled to the mobile base to permit at least vertical movement of the stationary base relative to the mobile base, and the stationary support member preferably inhibits lateral movement of the stationary base relative to the floor surface. The seat is supported by and pivotally coupled to the stationary base to move between a seating position in which the sitting surface is at a generally horizontal sitting angle and a folded position in which the sitting surface is at a generally vertical folded angle. The biasing member preferably provides a sufficient base biasing force to maintain the stationary support member at a vertical clearance distance above the floor surface when the mobile support member contacts the floor surface and the seat is in the folded position, so that the folding bench is supported on the floor surface by the mobile support member.

In one embodiment, the folded angle of the sitting surface is inclined at least about 45° relative to the floor surface.

In another embodiment, the seat back is supported by the stationary base.

In yet another embodiment, the engagement member is integral to the seat.

In still another embodiment, the bench further comprises an actuation member operatively connected to the mobile base, the engagement member configured to contact the actuation member and to transmit a lifting force from the stationary base to the mobile base through the actuation member during movement of the seat from the folded position to the seating position. The engagement member may be configured to contact the actuation member at an engagement position of the seat between the folded position and the seating position, to be spaced apart from the actuation member when the seat is between the folded position and the engagement position, and to remain in contact with the actuation member when the seat is between the engagement position and the seating position. A hook-shaped contact portion of the engagement member may have a curved profile configured to maintain generally vertical normal contact with a lower portion of the actuation member during pivotal movement of the engagement member and vertical movement of the actuation member. The actuation member may comprise a generally horizontal bar housed in a bushing, the bushing configured to be contacted by the engagement member and to rotate around the bar during movement of the engagement member in contact with the bushing to inhibit rubbing between the engagement member and the actuation member. The actuation member may be pivotally connected or integrally attached to the mobile base, or otherwise configured to move vertically in concert with the mobile base.

In yet another embodiment, a generally downward facing surface of the seat is configured to abut a generally upward facing surface of the stationary base when the seat is in the seating position, to prevent over-travel of the seat past the seating position.

In still another embodiment, the stationary base is connected to the mobile base by a sliding connection constraining the stationary base to generally vertical upward and downward movement relative to the mobile base. This sliding connection may comprise a smaller perimeter tube integral to one of the stationary base and the mobile base slidingly housed in a larger perimeter tube integral to the other of the stationary base and the mobile base. In this and other embodiments, the bench may further comprise a stop mechanism to limit vertical travel of the stationary base relative to the mobile base to movement between an uppermost position of the stationary base and a lowermost position of the stationary base. In particular, a generally horizontal pin may be carried by one of the smaller perimeter tube and the larger perimeter tube, the other of the smaller perimeter tube and the larger perimeter tube comprising a generally vertical slot slidably receiving the pin, the slot comprising an upper end and a lower end, the pin abutting against one of said ends of the slot at an uppermost position of the stationary base relative to the mobile base, and the pin abutting against the other of said ends of the slot at a lowermost position of the stationary base relative to the mobile base, to prevent upward movement of the stationary base from said uppermost position or downward movement of the stationary base from said lowermost position.

In yet another embodiment, the bench further comprises a retention mechanism configured to be engaged when the seat is in the seating position and to resist movement of the seat away from the seating position or upward movement of the stationary base relative to the mobile base. The retention mechanism may, for example, comprise a locking pin engaging a locking hole in one or both of the stationary base and the mobile base when the seat is in the seating position and the stationary support member is contacting the floor surface, so that movement of the seat toward the folded position or downward movement of the mobile base relative to the stationary base requires a human user manually withdrawing the locking pin from the locking hole. Alternatively, the retention mechanism comprises a detent mechanism in which a rounded surface of a detent member carried by one of the stationary base and the mobile base is received by and generally horizontally biased into a detent recess carried by the other of the stationary base and the mobile base, so that movement of the seat toward the folded position or downward movement of the mobile base relative to the stationary base requires applying a force sufficient to dislodge the detent member from the detent recess, the base biasing force of the base biasing member being insufficient to dislodge the detent member from the detent recess. The latter detent mechanism has the advantage over the locking pin mechanism of facilitating passive engagement and disengagement triggered by the single motion of pivoting the seat.

According to another aspect of the invention, a method of arranging restaurant booth style seating using two mobile folding benches and a table is provided. Each mobile folding bench may comprise any of the above-described combinations of elements according to the mobile folding bench aspect of the invention. The method comprises moving a first one of the benches having a first seat in the folded position and a first mobile base engaging a floor surface, to a position in which a first seat back surface of the first bench faces a first side of the table; unfolding the first seat to the seating position to cause a first mobile base of the first bench to disengage from the floor surface and a first stationary base of the first bench to engage the floor surface; moving a second one of the benches having a second seat in the folded position, having a second mobile base engaging a floor surface, to a position in which a second seat back surface of the second bench faces a second side of the table; and unfolding the second seat to the seating position to cause a second mobile base of the second bench to disengage from the floor surface and a second stationary base of the second bench to engage the floor surface.

In one embodiment in which one or both of the mobile folding benches comprises a manually engaged retention mechanism such as a retractable locking pin mechanism, the method further comprises engaging the retention mechanism when the respective seat is in the seating position, the retention mechanism resisting the respective base biasing force of the respective base biasing member to retain the respective seat in the seating position and the respective stationary frame in engagement with the floor surface.

BRIEF DESCRIPTION OF THE DRAWINGS

FIG. 1 is a front perspective view of a mobile folding bench according to an aspect of the invention, in a mobile, folded storage position, with seat back and seat shells removed to reveal its mechanisms.

FIG. 1A is a bottom plan view of a spring loaded ball component for use in a retention mechanism in a bench as in FIG. 1.

FIG. 1B is a perspective view of a ball recess component for use in conjunction with the spring loaded ball component shown in FIG. 1A.

DETAILED DESCRIPTION OF THE INVENTION

With reference to the accompanying drawing figures, a mobile folding restaurant booth style bench according to the invention will now be described in detail. A mobile folding bench 10 according to the invention includes a mobile base embodied as a pair of caster frames 12a, 12b that engage a supporting floor surface FS when bench 10 is in a mobile, folded storage position, depicted in FIG. 1, to facilitate easy movement of bench 10 between a storage location and a use location. In addition, bench 10 includes a stationary base embodied as a footed stationary frame 14 that engages floor surface FS in an unfolded, seating position of bench 10 illustrated from the right side in FIG. 2. Notably, when in the seating position, bench 10 is solely supported, at four outwardly positioned corners, by non-slip feet 16 of stationary frame 14. Thus, during normal use, bench 10 is fully immobilized and stabilized against tipping. The use of the terms "stationary frame" and "caster frames" is merely intended to be descriptive of the skeletal aspect of the respective bases of the illustrated embodiments, which may be formed from steel tubing, for example, and not to limit the invention to exclude stationary or mobile bases having a bulk solid or shell geometry.

Figure 2:
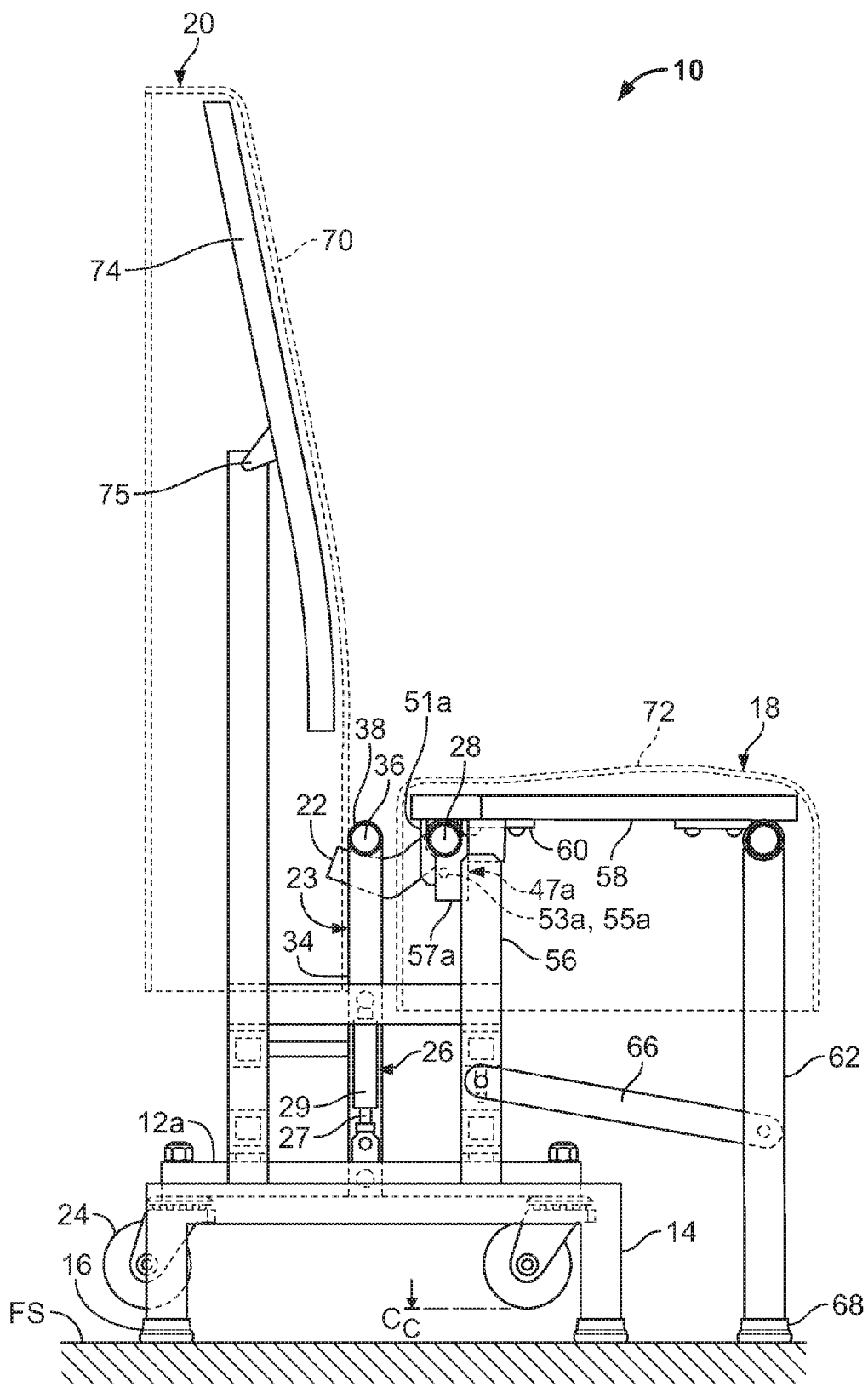
FIG. 2 is a side elevation view of the bench shown in FIG. 1 in an unfolded, stationary seating position, with the positions of seat back and seat shells depicted in phantom view.

Illustrative linkage components and a sequence of folding bench 10 from the seating position to the folded position are shown in FIGS. 2-5. With reference to FIG. 2, a seat 18 of bench 10 is pivotally mounted to stationary frame 14, and a seat back 20 of bench 10 is fixedly mounted to stationary frame 14. The collective weight of seat 18 and seat back 20 is supported by stationary frame 14.

Mounting seat back 20 to stationary frame 14 has the benefit of maintaining a fixed relative height relationship between seat back 20 and seat 18, which is also connected to stationary frame 14. In addition, mounting seat back 20 to stationary frame 14 instead of to caster frames 12a, 12b allows caster frames 12a, 12b to be unattached to and independent of each other, allowing for independent suspension and thus a smoother ride when moving bench 10 on casters 24. This arrangement also inhibits the possibility of sliding mechanisms locking up due to tilting of a unitary caster frame in response to unevenly applied forces when folding and unfolding bench 10.

Notwithstanding certain disadvantages mentioned above, seat back 20 could alternatively be attached to caster frames 12a, 12b. Although this would increase the amount of weight supported by caster frames 12a, 12b suspended above floor surface FS when bench 10 is in the seating position, it would in the same measure decrease the amount of force required from a suitable biasing component (described in more detail below as cylinder assembly 26) to support stationary frame 14 above floor surface FS. Thus, attaching seat back 20 to caster frames 12a, 12b instead of stationary frame 14 would have minimal if any net effect on the amount of effort required to deploy bench 10 in the seating position, which requires lifting the weight of caster frames 12a, 12b and opposing the biasing force tending to lift stationary frame 14. An engagement member 22 fixedly attached to seat 18 supports caster frames 12a, 12b suspended above floor surface FS, applying a lifting force to each of a pair of actuators 23 that are operatively connected to each caster frame 12a, 12b to maintain a clearance $C_C$ between casters 24 of caster frames 12a, 12b and floor surface FS.

A suitable biasing component is operatively connected between stationary frame 14 and caster frames 12a, 12b so as to bias stationary frame 14 in an upward direction relative to caster frames 12a, 12b. For example, the biasing component may be a compressed gas cylinder assembly 26, including a piston 27 connected to each caster frame 12a, 12b and a cylinder 29 connected to stationary frame 14, cylinder assembly 26 providing a biasing force tending to extend its length by forcing an increasing length of piston 27 out of cylinder 29. Other suitable biasing components (not shown) may include, without limitation, solid state compression, tension, or torsion springs (such as a torsion bar), or magnets.

Thus, to lift caster frames 12a, 12b from floor surface FS and lower stationary frame 14 into engagement with floor surface FS, engagement member 22 must bear the sum of the weight of caster frames 12a, 12b and the biasing force from cylinder assembly 26, in turn transmitting these forces through seat 18 to stationary frame 14. To retain bench 10 in this position, a sufficient moment must be applied to seat 18, supplied either by the weight of an occupant sitting on seat 18 or by a suitable resistance or locking mechanism (discussed in more detail below), to counterbalance the resultant moment about a seat pivot joint 28 produced by the downward force of actuator 23 on engagement member 22.

Figure 3:
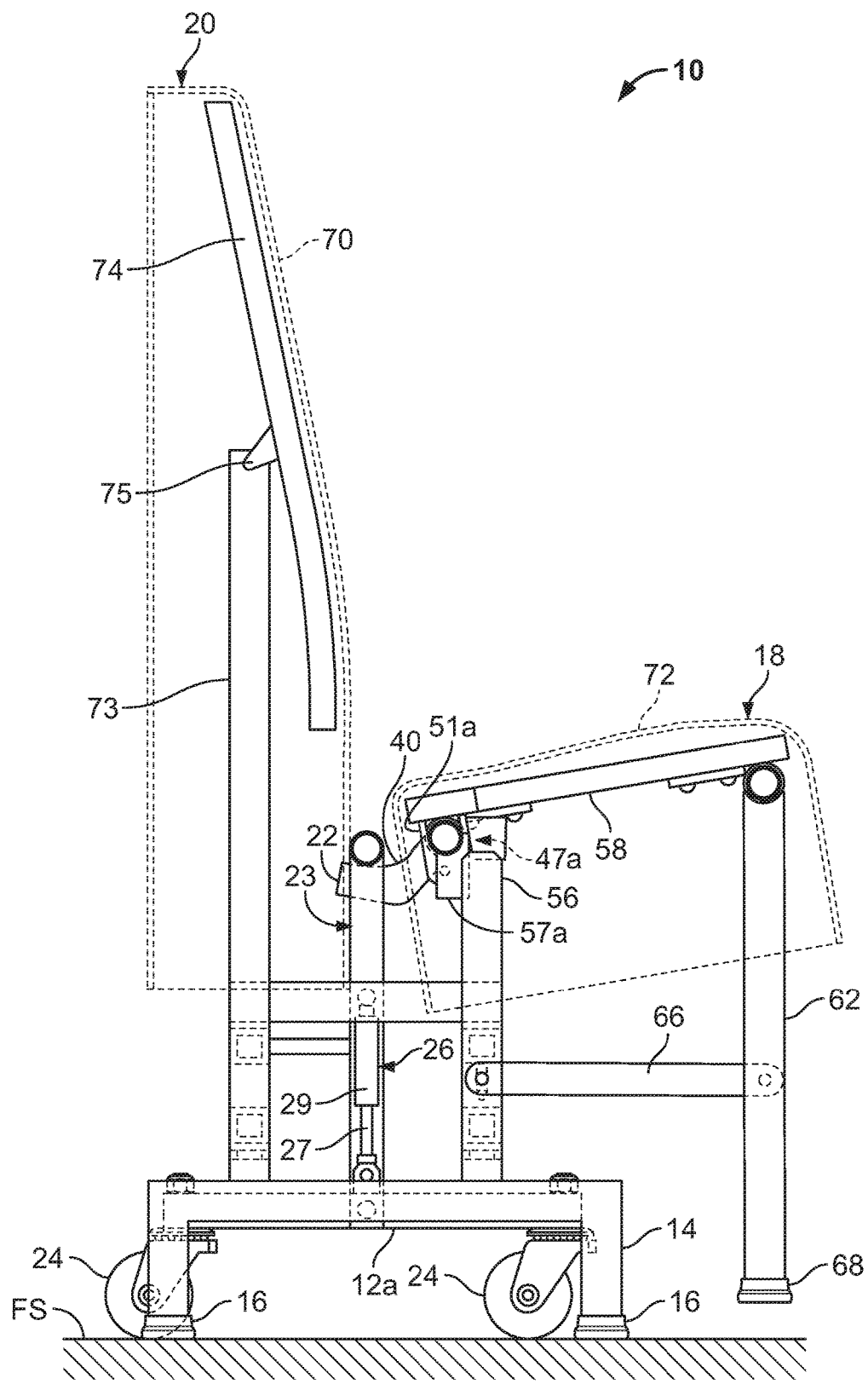
FIG. 3 is a side elevation view of the bench as shown in FIG. 2, in a partially folded position in which its mobile and stationary bases contact a supporting floor surface simultaneously.

Turning to FIG. 3, a partially folded intermediate position of bench 10 is depicted, in which seat 18 has been pivoted up, and thus engagement member 22 has been pivoted down, to permit the lowering of actuator 23 and caster frames 12a, 12b to a position in which the bottoms of casters 24 and feet 16 are aligned on the same horizontal plane, so that they contact floor surface FS simultaneously. Raising seat 18 further from this position shifts the weight of bench 10 fully onto casters 24, while lowering seat 18 further from this position shifts the weight of bench 10 back to feet 16.

Figure 4:
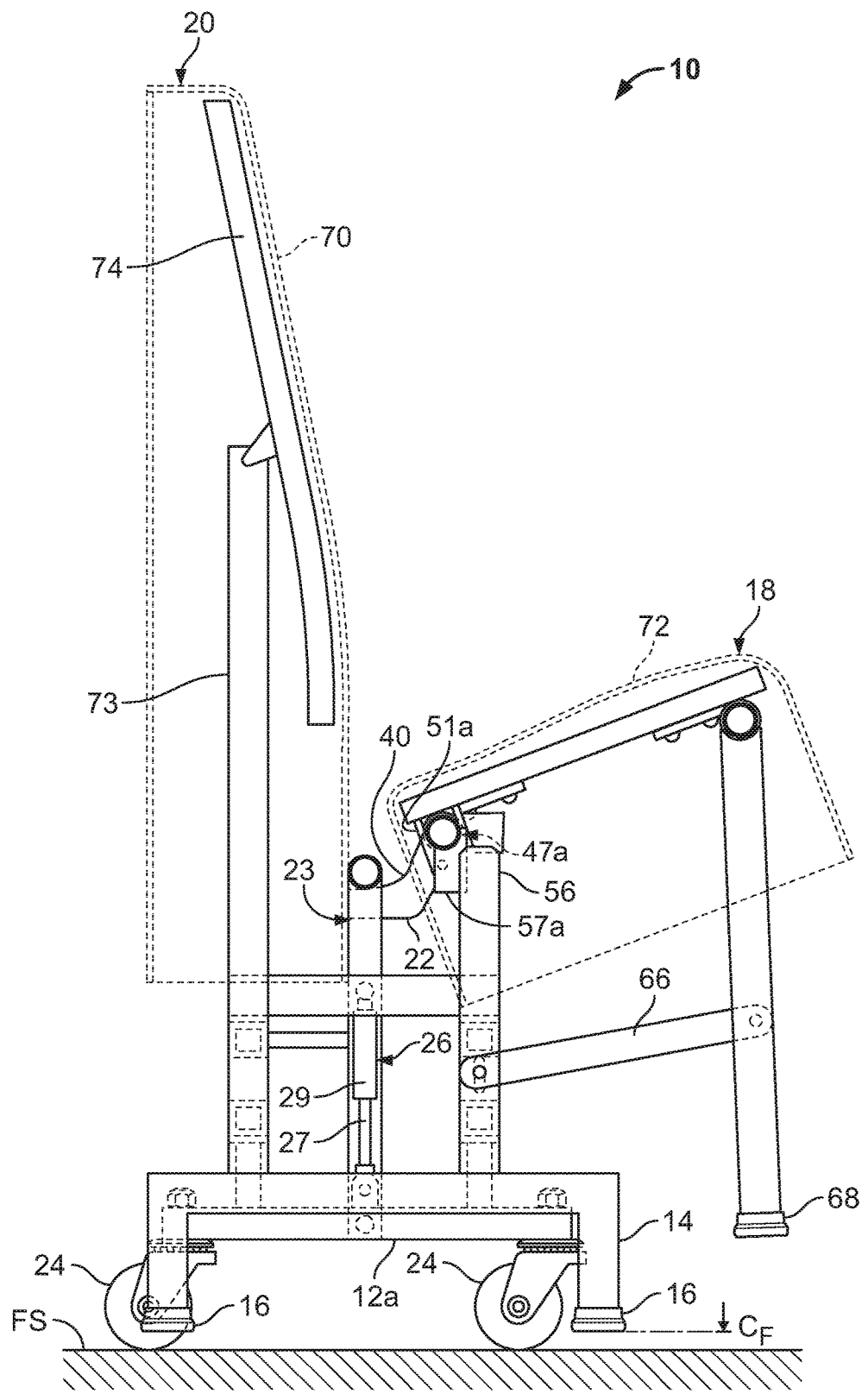
FIG. 4 is a side elevation view of the bench as shown in FIG. 2, in a partially folded position of initial engagement of an engagement member for shifting the bench from a mobile frame to a stationary frame.

Next, as seat 18 continues to be raised, a loss of engagement position (or initial engagement position for the reverse, lowering sequence of seat 18) of engagement member 22 and actuator 23 is reached, as shown in FIG. 4. In this position, engagement member 22 and actuator 23 are touching, but no force is transmitted between them. This initial engagement/loss of engagement position corresponds to the maximum extension of cylinder assembly 26 and thus the highest position to which it can lift stationary frame 14 above caster frames 12a, 12b. This highest position may, for example, be the position at which a variable biasing force equals the combined weight of stationary frame 14 and its attached components. In that case, the biasing force would be initially larger than the combined weight of frame 14 when seat 18 is fully unfolded, and would be reduced to a force equal to said combined weight as cylinder assembly 26 extended.

More preferably, the highest position of the stationary frame is a fixed position in which a member or component of bench 10 meets an obstruction, which may correspond to piston 27 reaching the end of its travel or some other stop member abutting against a stop surface. This allows the biasing force to be substantially greater than the weight it supports throughout the relative movement of caster frames 12a, 12b and stationary frame 14, providing fast lift assist action, without overshooting the desired highest position of stationary frame 14. In the illustrated example, a stop pin 30 travels up and down with each caster frame 12a, 12b, within a slot 32 formed in stationary frame 14. When stop pin 30 reaches a bottom end 33 of slot 32, as seen in FIG. 1, stationary frame 14 can be raised no higher and cylinder assembly 26 can extend no further. The highest position of stationary frame 14 should be established so that engagement member 22 and actuator 23 are relatively positioned for effective force transmission at the initial engagement position, as also mentioned below.

Figure 5:
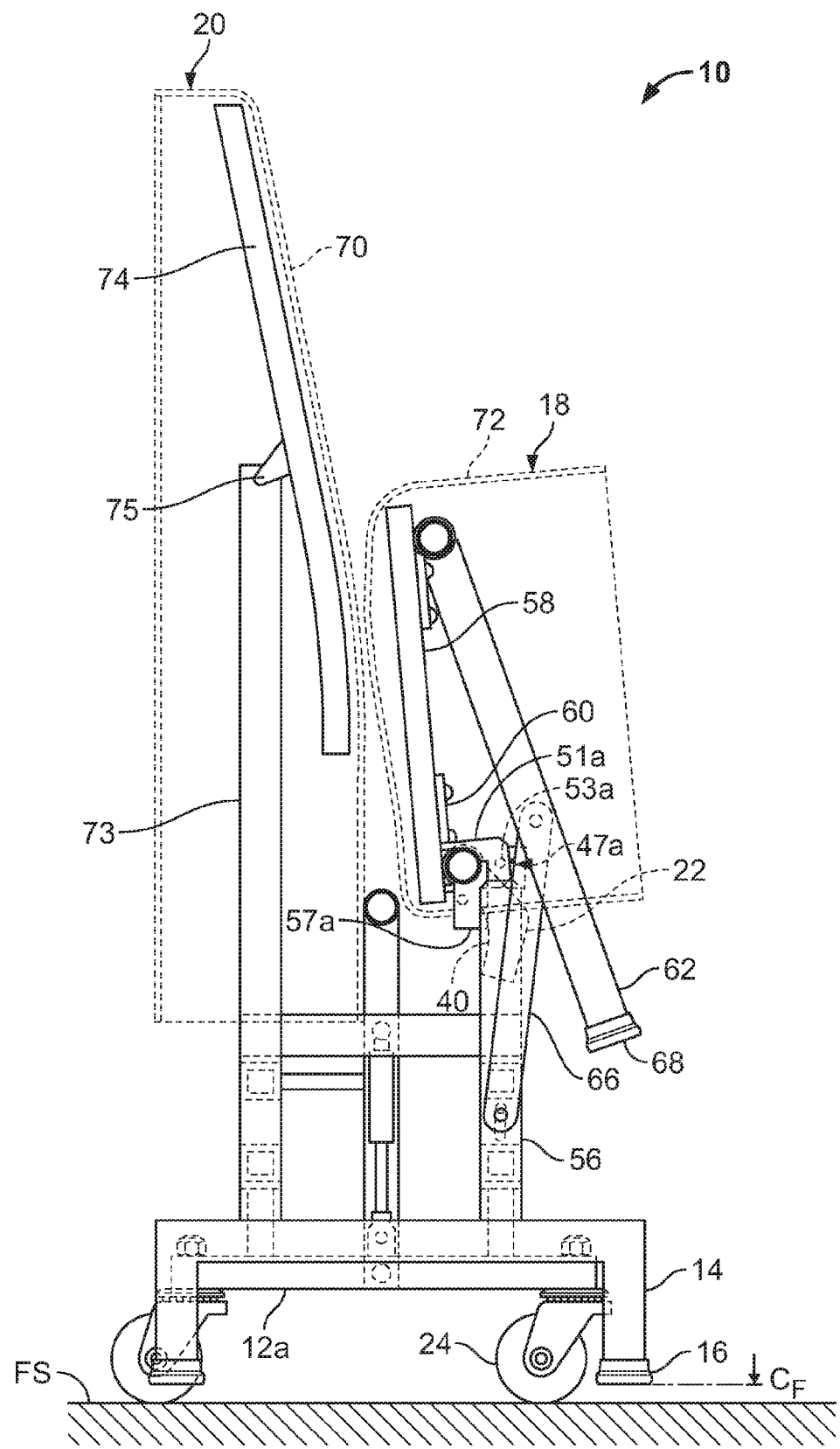
FIG. 5 is a side elevation view of the bench as shown in FIG. 2, in the mobile, folded storage position shown in FIG. 1.

Continuing to pivot seat 18 upward from the loss of engagement/initial engagement position shown in FIG. 4 to an approximately vertical orientation produces the folded position of bench 10 shown in FIG. 5, in which a clearance $C_F$ is maintained between feet 16 and floor surface FS. As noted above, in this position stationary frame 14 floats above caster frames 12a, 12b on cylinder assembly 26. An ancillary benefit provided by this arrangement is shock absorption; that is, if casters 24 roll over a bump (such as a doorway threshold) while a human user is transporting bench 10 in the folded position, the shock of the bump will be absorbed by a slight compression of cylinder assembly 26, reducing any jolt felt by the user.

Figure 7:
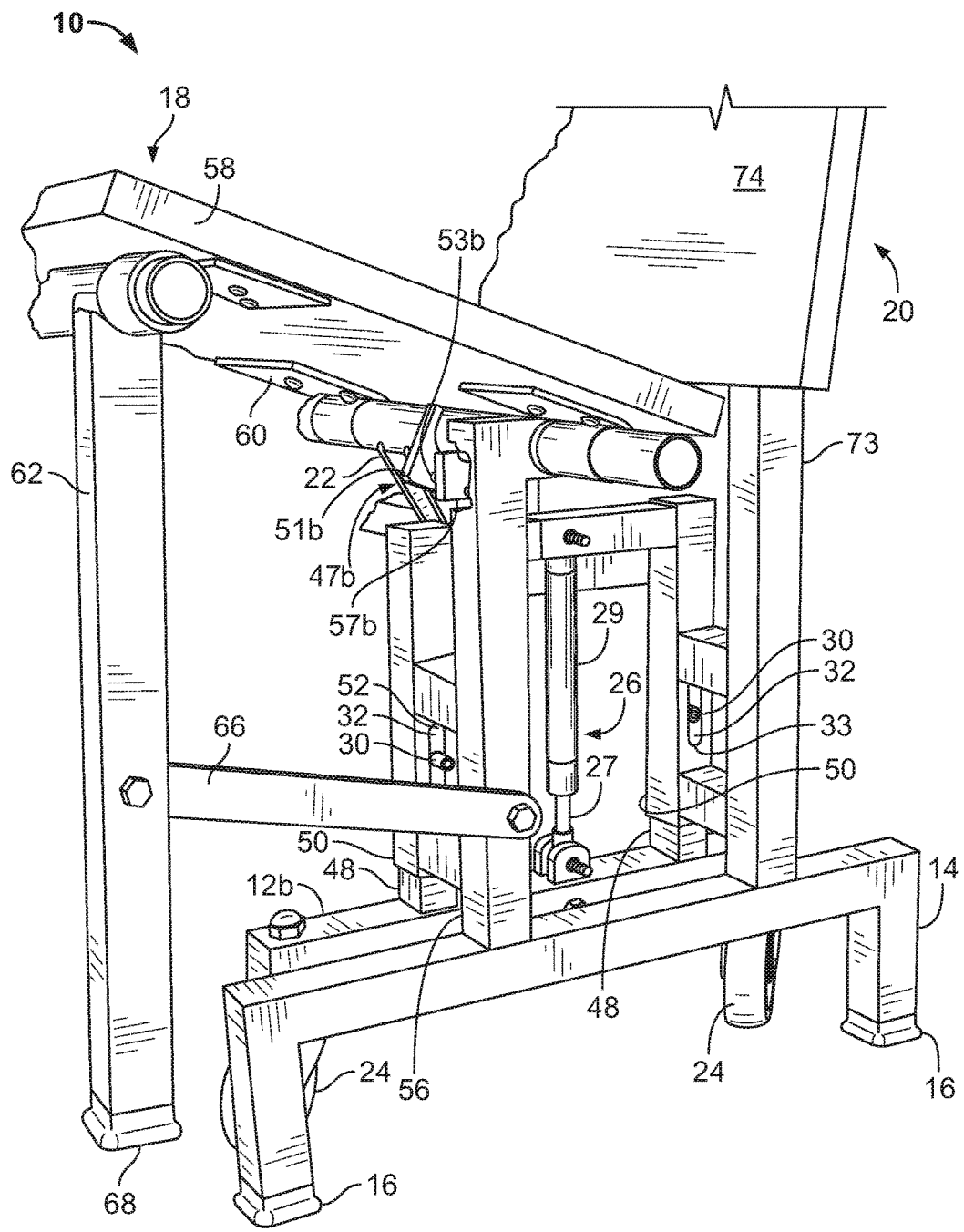
FIG. 7 is a fragmentary perspective view of the left side of the bench shown in FIG. 1, in a partially folded position.
Figure 8:
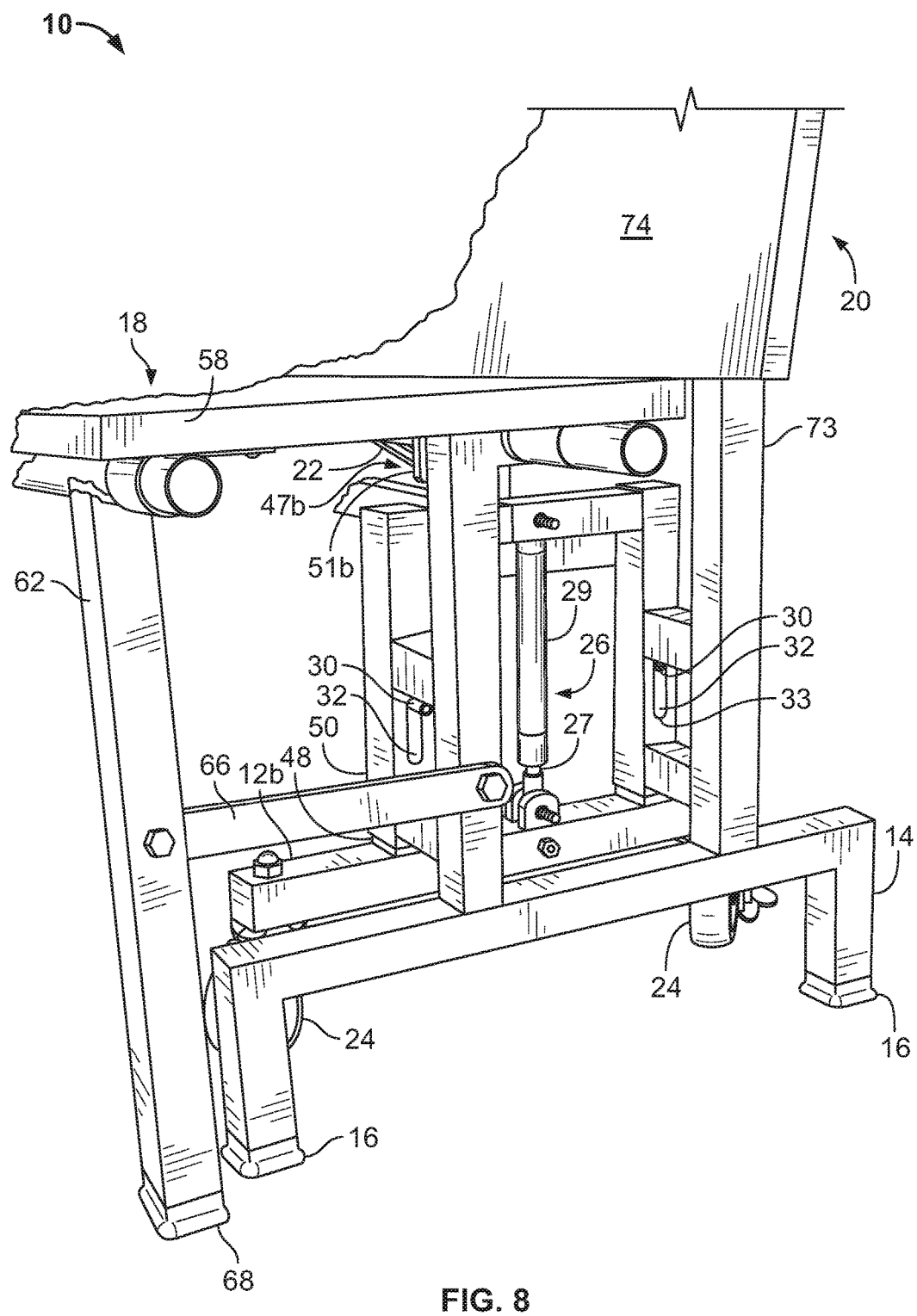
FIG. 8 is a fragmentary perspective view of the bench as shown in FIG. 7, in a stationary, unfolded seating position.

Additional components and features supporting the folding of bench 10 between its seating and folded positions will now be described with reference to FIGS. 1, 7, and 8.

As best shown in FIG. 1, each actuator 23 comprises an actuator column 34 connected at its lower end to the respective caster frame 12a, 12b, a lift bar 36 integral to and extending horizontally from actuator column 34, and a low friction contact bushing 38 rotatably mounted on lift bar 36. Thus, as engagement member 22 pivots between the loss of engagement/initial engagement position and the seating position, and the point of contact between engagement member 22 and bushing 38 shifts with respect to engagement member 22, bushing 38 slidingly rotates around lift bar 36. Bushing 38 thus prevents rubbing and wear between engagement member 22 and lift bar 36. Also, it will be noted that engagement member 22 comprises a curved contact region 40 providing contact with bushing 38 throughout the engaged range of motion. The upward concavity of contact region 40 helps to maintain approximately vertical transmission of force to actuator 23 throughout the pivoting of engagement member 22.

In alternative embodiments in which a contact region of an engagement member instead includes a contact region with a straight profile (not shown), the direction of a normal (perpendicular) contact force transmitted from the engagement member would inevitably deviate from vertical to some degree. The size of the angle by which the force transmission direction would deviate from vertical for a straight-profile contact region may be limited by appropriately establishing its initial angle (for example by adjusting parameters including the size, shape, and attachment location of the engagement member and/or setting the maximum height to which stationary frame 14 is raised in one of the ways described above) and limiting the angular range of motion of the engagement member through which it remains in contact with actuator 23.

In other embodiments, different force transmission components, such as pneumatics, hydraulics, magnets, or rack-and-pinion gear assemblies, for example, may be employed in lieu of a sliding normal contact engagement member to convert pivotal movement of seat 18 into relative vertical movement of caster frames 12a, 12b and stationary frame 14, which may inherently avoid the problem of a varying direction of force transmission. In such embodiments, the alternative force transmission components may also be configured so that seat 18 can transmit force and movement to the frames not only when pivoting down (forcing stationary frame 14 down and caster frames 12a, 12b up), but also when pivoting up (forcing caster frames 12a, 12b down and stationary frame 14 up). A mechanism in which upward pivoting of the seat is converted to upward vertical movement of the stationary frame could substitute for a base biasing component, as the force required to raise the stationary frame could instead be provided by a user in folding the seat, and the bench could be retained in the folded position by a suitable locking mechanism, which may be similar to locking mechanisms discussed below for retaining the bench in the unfolded seating position. Alternatively, a biasing component may nonetheless be used to assist a user in raising the stationary frame, but need not provide a force equal to the entire weight of the stationary frame and its attached components if a lifting force is transmitted to the stationary frame by folding the seat.

Optionally, as in the illustrated embodiment, each actuator column 34 may be connected to the respective caster frame 12a, 12b by a pivotal joint 44, and slidingly retained in a sliding collar 46 fixed with respect to stationary frame 14, collar 46 allowing column 34 some clearance to pivot but retaining column 34 in an approximately upright orientation. This connection arrangement of actuator column 34 permits column 34 to seek an angle in which the force transmission direction from engagement member 22 to actuator 23 is generally aligned with column 34, to inhibit possible fatigue of column 34 due to repetitive bending stresses.

In the illustrated embodiment, stationary frame 14 is constrained solely to vertical sliding movement relative to caster frames 12a, 12b. This vertical sliding connection between caster frames 12a, 12b and stationary frame 14 is provided by smaller perimeter uprights 48 of caster frames 12a, 12b slidingly inserted into larger perimeter uprights 50 of stationary frame 14, uprights 48 carrying one or more of the aforementioned stop pin 30 and uprights 50 having a corresponding one or more of the aforementioned slot 32 formed therein. As shown in the drawings, particularly FIG. 1, each of four uprights 48 carries a stop pin 30, and each of four uprights 50 includes a corresponding slot 32.

As mentioned above, when bench 10 is in the seating position, a suitable locking mechanism may be employed to oppose or resist the tendency of cylinder assembly 26 to extend, thereby forcing seat 18 to pivot upward and lifting stationary frame 14 off of floor surface FS. A passive locking mechanism is preferred, being capable of providing sufficient resistance to maintain bench 10 in the seating position, but also capable of being disengaged by a sufficient lifting force applied to seat 18 without harming any components or requiring a separate action by a human operator, such as pulling out a pin or sliding a bolt before lifting. In addition, the passive locking mechanism preferably engages automatically when seat 18 is lowered to the seating position, without requiring an additional action such as inserting a pin or sliding a bolt. One such passive locking mechanism is a spring loaded ball detent locking mechanism 47a, 47b, best shown in FIGS. 1, 7, and 8. Detent locking mechanism 47a, 47b includes a spring loaded ball component 53a, 53b attached to a plate 51a, 51b carried by seat 18, which snaps into a recess 55a, 55b formed in a plate 57a, 57b carried by stationary frame 14 when bench 10 is in the seating position, requiring a threshold lifting torque on seat 18 greater than that provided by cylinder assembly 26 to dislodge or pop ball component 53a, 53b out of engagement with recess 55a, 55b. Plate 51a having attached ball component 53a is shown in greater detail in FIG. 1A, and plate 57a having recess 55a formed therein is shown in greater detail in FIG. 1B.

Certain features and components of bench 10 serve to prevent over-travel of seat 18 in the downward pivoting direction past its generally horizontal orientation in the seating position. Thus, it will be noted that slot 32 has an upper end 52 in addition to bottom end 33 already mentioned. Upper end 52 limits the upward travel of the respective caster frame 12a, 12b, thus preventing downward pivoting over-travel of seat 18 from pivoting downward past its generally horizontal orientation in the seating position. Additionally, a generally flat top surface 54 of an upright 56 of stationary frame 14, to which seat 18 is pivotally connected, abuts a flat bottom surface of seat 18 when seat 18 is in the seating position, also preventing downward pivoting over-travel of seat 18. Finally, detent locking mechanism 47a, 47b may provide yet another redundant safeguard against downward over-travel of seat 18, should the others fail.

Notwithstanding the foregoing stop mechanisms, it may be desirable to provide front legs to support seat 18, to enhance stability against forward tipping of bench 10 while also preventing undue bending stresses on a seat base panel 58 and/or shear stresses on hinge mounting plates 60 or other connections between seat base panel 58 and stationary frame 14 by bracing the front end of seat base panel 58 against floor surface FS. Thus, a pivoting seat front leg member 62 comprising a pair of seat front legs 64 is provided in the illustrated embodiment. A pair of guide links 66 are pivotally connected between each front leg 64 and the corresponding adjacent upright 56 of stationary frame 14, to facilitate compact retention of leg member 62 in the folded position of bench 10 and to align each front leg 64 vertically in the seating position. Similarly to stationary frame 14, front leg member 62 is provided with non-slip feet 68 to further inhibit sliding on floor surface FS.

Figure 9:
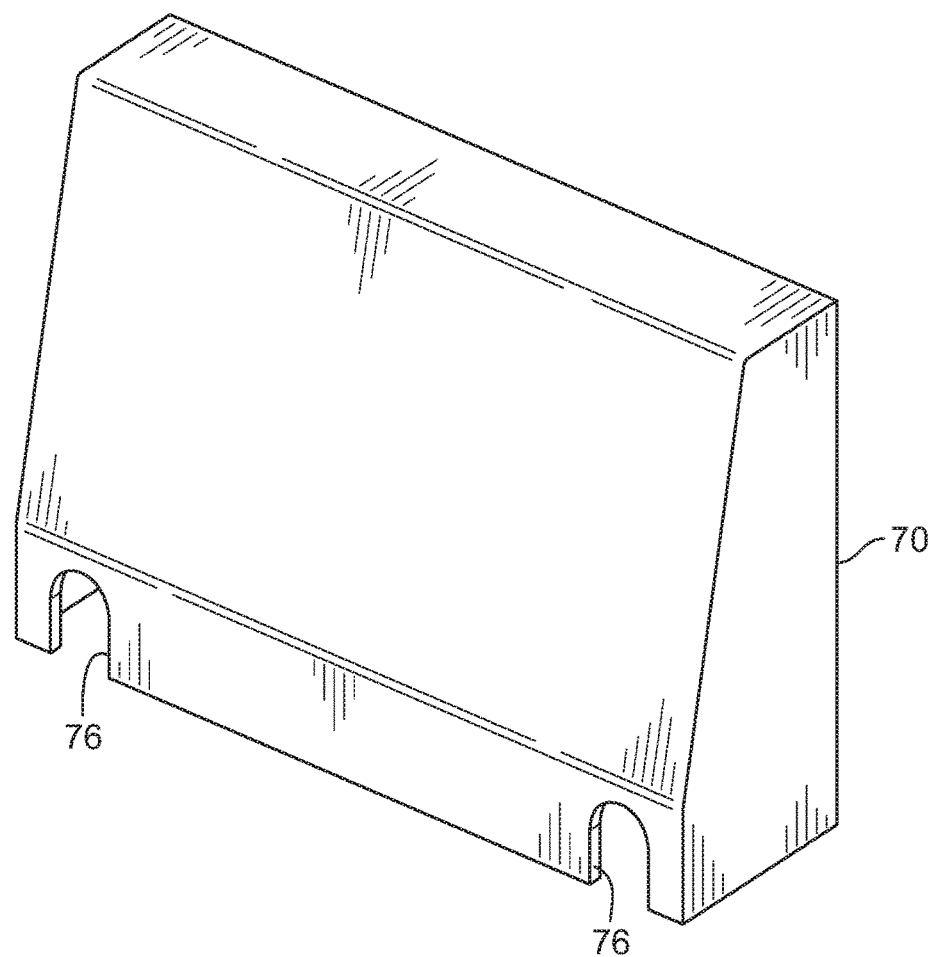
FIG. 9 is a perspective view of a seat back shell for use in a mobile folding bench according to an aspect of the invention.
Figure 10:
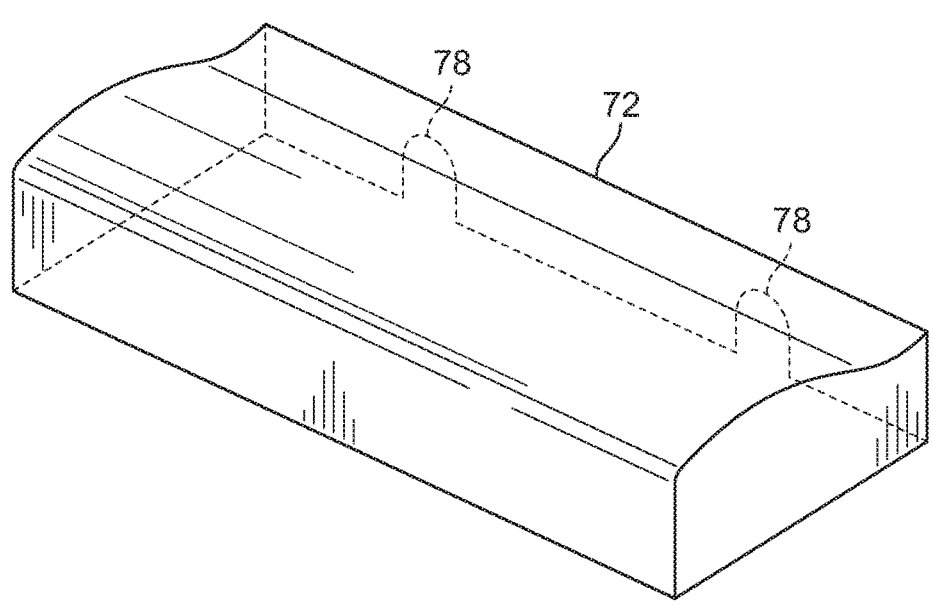
FIG. 10 is a perspective view of a seat shell for use in a mobile folding bench according to an aspect of the invention.

In addition to the components described in the above paragraphs, bench 10 may incorporate any suitable combination of panels, contoured shells, cushions or other appropriate seat cover structure to promote ergonomics, comfort, and/or aesthetic appeal. For example, as illustrated in FIGS. 2-5, seat back 20 may include a seat back shell 70, as depicted in FIG. 9, and seat 18 may include a seat shell 72, as depicted in FIG. 10. Seat back shell 70 and seat shell 72 may be formed from any suitable material, such as plastic, wood, or fiberglass. Seat shell 72 may be attached to seat base panel 58 in any suitable manner or may be integral thereto. Similarly, seat back shell 70 may be fixedly attached by any suitable connecting structure (not shown) to a seat back base panel 74 or may be integral thereto. In turn, seat back base panel 74 is attached to rear uprights 73 of stationary frame 14 by a suitable joint 75. In the embodiment depicted as bench 10 having seat back shell 70 and seat shell 72, joint 75 is preferably a fixed joint. For aesthetic and safety purposes, it may be desirable to substantially conceal and/or cover at least a substantial portion of engagement member 22 and/or actuator 23 inside seat back shell 70 and/or seat shell 72. Thus, notches 76 (shown in FIG. 9) are preferably provided in a bottom front edge of seat back shell 70, and notches 78 (shown in FIG. 10) in a bottom rear edge of seat shell 72, to permit protrusion of some portion of engagement member 22 into the interior of seat back shell 70 when bench 10 is in the seating position, as illustrated in FIG. 2.

Figure 6:
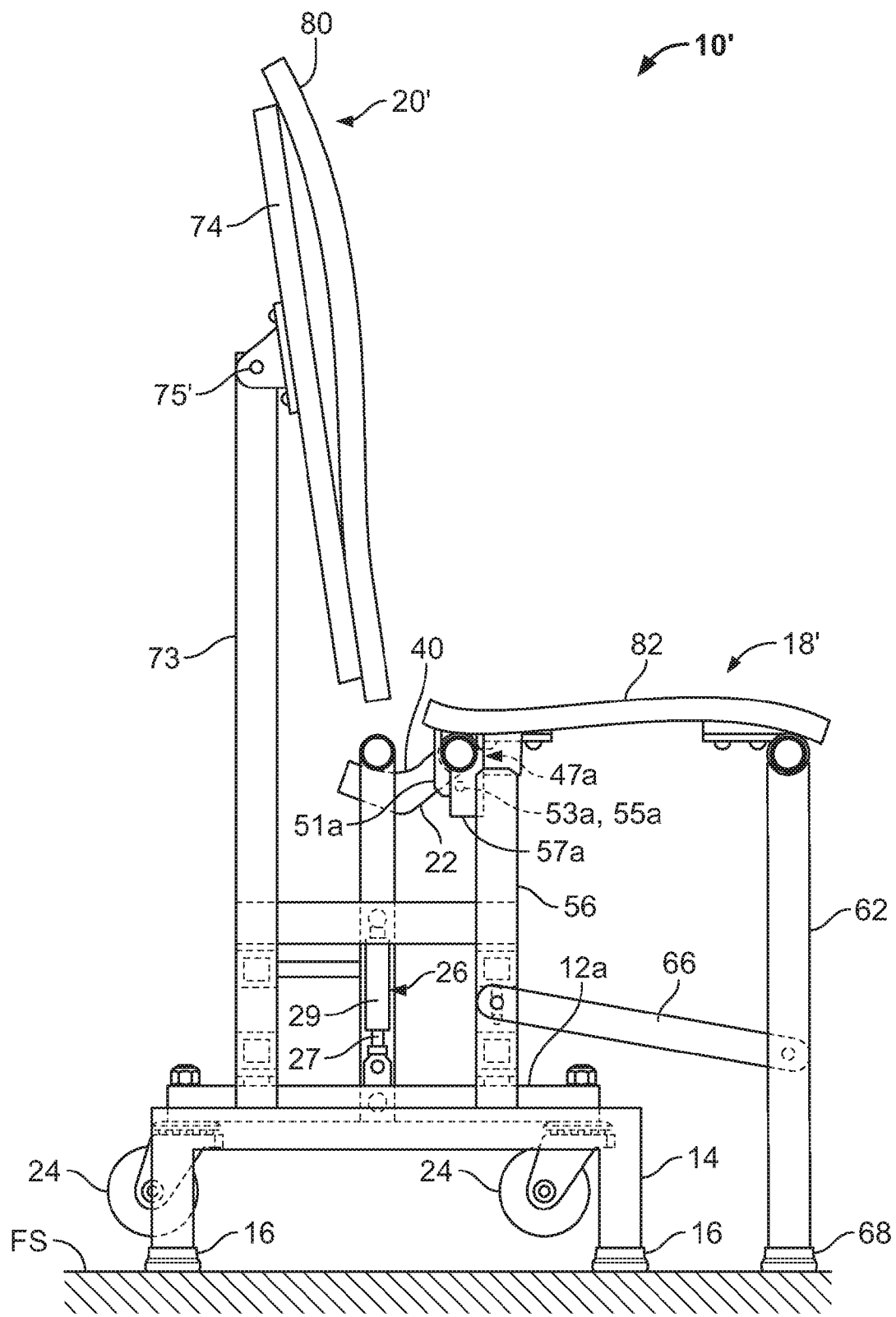
FIG. 6 is a side elevation view of an alternative embodiment of a mobile folding bench according to an aspect of the invention, in a stationary, unfolded seating position.

In another embodiment of a bench 10', depicted in FIG. 6, an alternative seat back 20' is accommodated with a generally flat, contoured seat back panel 80 attached in a suitable manner to seat back base panel 74, and an alternative seat 18' may comprise a contoured seat panel 82. In bench 10', seat back base panel 74 is attached to rear upright 73 by a joint 75' which may be a fixed or adjustable pivot joint, in the latter case preferably providing friction or locking means to retain base panel 74 at a selected angle. Seat panel 82 may attach directly to front leg member 62 and stationary frame uprights 56 as shown in the drawing, or it may attach in a suitable manner to a seat base panel similar to seat base panel 58.

Figure 11:
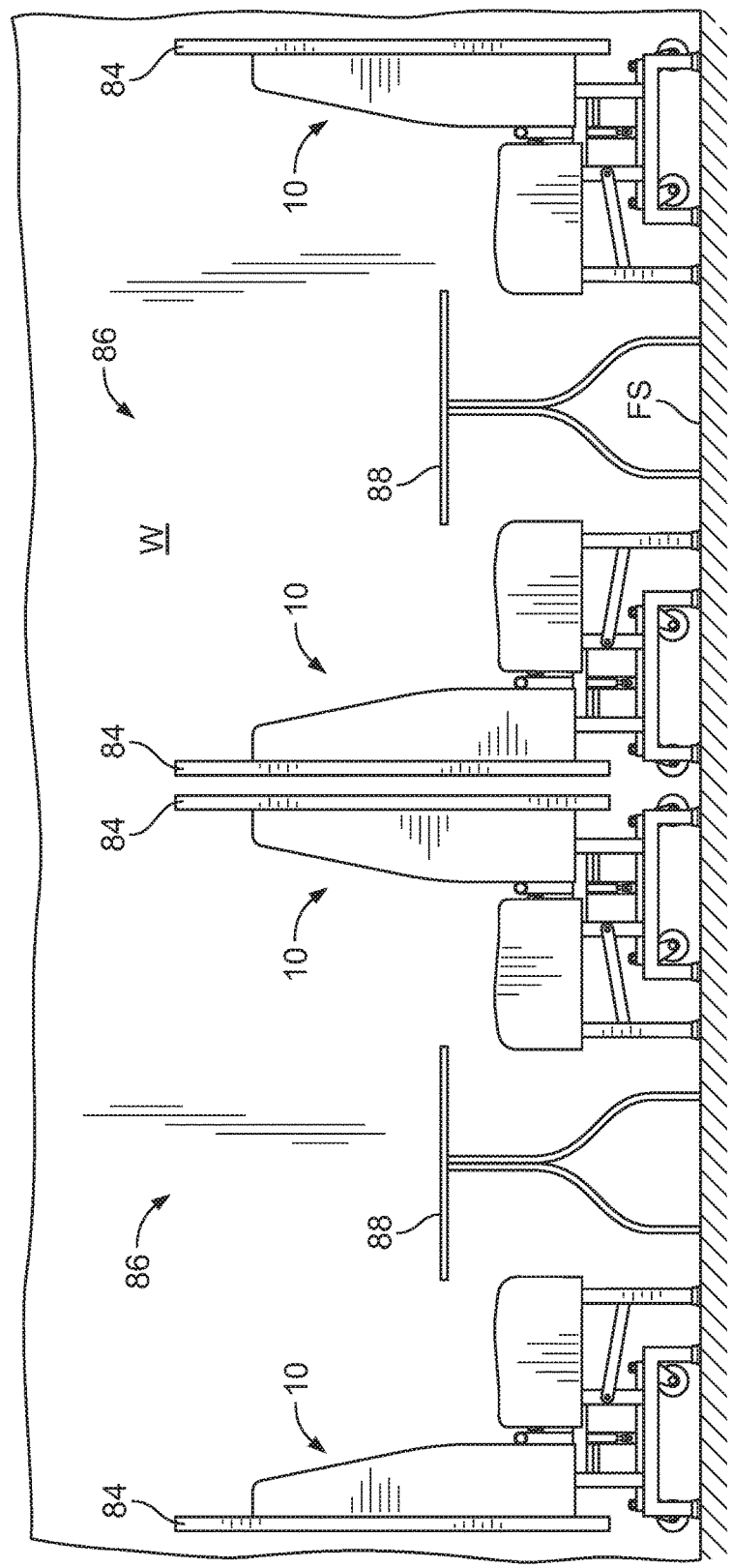
FIG. 11 is a side elevation view of four mobile folding benches arranged around two tables to form a pair of adjacent restaurant style booths according to another aspect of the invention.

Finally, a privacy panel 84 is preferably provided to separate the seating space provided by one booth from that of adjacent booths and/or from common spaces or walking areas. Thus, illustrated in FIG. 11 is an example arrangement of two booths 86 arranged back-to-back adjacent a wall W, each booth 86 defined by a pair of benches 10 as previously described, facing opposite sides of a table 88.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:
1. A mobile folding bench comprising
 a generally vertically oriented seat back comprising a forward facing seat back surface configured to support the back of a sitting human occupant;
 a seat comprising a sitting surface configured to seat the human occupant, the seat disposed in front of the seat back;
 a mobile base comprising at least one mobile support member adapted to support the mobile base on a floor surface and to facilitate lateral movement of the mobile base relative to the floor surface;
 a stationary base movably coupled to the mobile base to permit at least vertical movement of the stationary base relative to the mobile base, the stationary base comprising at least one stationary support member adapted to support the stationary base on a generally horizontal floor surface and to inhibit lateral movement of the stationary base relative to the floor surface, the seat being supported by and pivotally coupled to the stationary base to move between a seating position in which the sitting surface is at a generally horizontal sitting angle and a folded position in which the sitting surface is at a generally vertical folded angle;
 the seat back being supported by at least one of the mobile base and the stationary base;
 a base biasing member connected between the mobile base and the stationary base and biasing the stationary base in a generally upward direction relative to the mobile base, the biasing member providing a sufficient base biasing force to maintain the stationary support member at a vertical clearance distance above the floor surface when the mobile support member contacts the floor surface and the seat is in the folded position, so that the folding bench is supported on the floor surface by the mobile support member;
 an engagement member operatively connected to the seat and configured to transmit a lifting force from the stationary base to the mobile base to lift the mobile base relative to the stationary base when the seat is moved from the folded position to the seating position, so that the folding bench is supported on the floor surface by the stationary support member; and
 an actuation member operatively connected to the mobile base, the engagement member configured to contact the actuation member and to transmit a lifting force from the stationary base to the mobile base through the actuation member during movement of the seat from the folded position to the seating position.

2. The folding bench of claim 1, the mobile support member comprising a swivel caster.

3. The folding bench of claim 1, said folded angle of the sitting surface being at least about 45° relative to the floor surface.

4. The folding bench of claim 1, the seat back being supported by the stationary base.

5. The folding bench of claim 1, the engagement member being integral to the seat.

6. The folding bench of claim 1, the engagement member configured to contact the actuation member at an engagement position of the seat between the folded position and the seating position, to be spaced apart from the actuation member when the seat is between the folded position and the engagement position, and to remain in contact with the actuation member when the seat is between the engagement position and the seating position.

7. The folding bench of claim 1, the engagement member comprising a hook-shaped contact portion configured to maintain generally vertical normal contact with a lower portion of the actuation member during pivotal movement of the engagement member and vertical movement of the actuation member.

8. The folding bench of claim 1, the actuation member comprising a generally horizontal bar housed in a bushing, the bushing configured to be contacted by the engagement member and to rotate around the bar during movement of the engagement member in contact with the bushing to inhibit rubbing between the engagement member and the actuation member.

9. The folding bench of claim 1, the actuation member being integral to the mobile base.

10. The folding bench of claim 1, a generally downward facing surface of the seat configured to abut a generally upward facing surface of the stationary base when the seat is in the seating position, to prevent over-travel of the seat past the seating position.

11. A mobile folding bench comprising
- a generally vertically oriented seat back comprising a forward facing seat back surface configured to support the back of a sitting human occupant;
- a seat comprising a sitting surface configured to seat the human occupant, the seat disposed in front of the seat back;
- a mobile base comprising at least one mobile support member adapted to support the mobile base on a floor surface and to facilitate lateral movement of the mobile base relative to the floor surface;
- a stationary base movably coupled to the mobile base by a sliding connection constraining the stationary base to generally vertical upward and downward movement of the stationary base relative to the mobile base, the stationary base comprising at least one stationary support member adapted to support the stationary base on a generally horizontal floor surface and to inhibit lateral movement of the stationary base relative to the floor surface, the seat being supported by and pivotally coupled to the stationary base to move between a seating position in which the sitting surface is at a generally horizontal sitting angle and a folded position in which the sitting surface is at a generally vertical folded angle;
- the seat back being supported by at least one of the mobile base and the stationary base;
- a base biasing member connected between the mobile base and the stationary base and biasing the stationary base in a generally upward direction relative to the mobile base, the biasing member providing a sufficient base biasing force to maintain the stationary support member at a vertical clearance distance above the floor surface when the mobile support member contacts the floor surface and the seat is in the folded position, so that the folding bench is supported on the floor surface by the mobile support member; and
- an engagement member operatively connected to the seat and configured to transmit a lifting force from the stationary base to the mobile base to lift the mobile base relative to the stationary base when the seat is moved from the folded position to the seating position, so that the folding bench is supported on the floor surface by the stationary support member.

12. The folding bench of claim 11, said sliding connection comprising a smaller perimeter tube integral to one of the stationary base and the mobile base slidingly housed in a larger perimeter tube integral to the other of the stationary base and the mobile base.

13. The folding bench of claim 12, further comprising a generally horizontal pin carried by one of the smaller perimeter tube and the larger perimeter tube, the other of the smaller perimeter tube and the larger perimeter tube comprising a generally vertical slot slidably receiving the pin, the slot comprising an upper end and a lower end, the pin abutting against one of said ends of the slot at an uppermost position of the stationary base relative to the mobile base, and the pin abutting against the other of said ends of the slot at a lowermost position of the stationary base relative to the mobile base, to prevent upward movement of the stationary base from said uppermost position or downward movement of the stationary base from said lowermost position.

14. The folding bench of claim 1, further comprising a stop mechanism to limit vertical travel of the stationary base relative to the mobile base to movement between an uppermost position of the stationary base and a lowermost position of the stationary base.

15. The folding bench of claim 1, further comprising a retention mechanism configured to be engaged when the seat is in the seating position and to resist movement of the seat away from the seating position or upward movement of the stationary base relative to the mobile base.

16. The folding bench of claim 15, the retention mechanism comprising a locking pin engaging a locking hole in one or both of the stationary base and the mobile base when the seat is in the seating position and the stationary support member is contacting the floor surface, so that movement of the seat toward the folded position or downward movement of the mobile base relative to the stationary base requires a human user manually withdrawing the locking pin from the locking hole.

17. The folding bench of claim 15, the retention mechanism comprising a detent mechanism in which a rounded surface of a detent member carried by one of the stationary base and the mobile base is received by and generally horizontally biased into a detent recess carried by the other of the stationary base and the mobile base, so that movement of the seat toward the folded position or downward movement of the mobile base relative to the stationary base requires applying a force sufficient to dislodge the detent member from the detent recess, the base biasing force of the base biasing member being insufficient to dislodge the detent member from the detent recess.

18. A method of arranging restaurant booth style seating using two mobile folding benches and a table, each mobile folding bench comprising a generally vertically oriented seat back comprising a forward facing seat back surface configured to support the back of a sitting human occupant; a seat comprising a sitting surface configured to seat the human occupant, the seat disposed in front of the seat back; a mobile base comprising at least one mobile support member adapted to support the mobile base on a floor surface and to facilitate lateral movement of the mobile base relative to the floor surface; a stationary base movably coupled to the mobile base to permit at least vertical movement of the stationary base relative to the mobile base, the stationary base comprising at least one stationary support member adapted to support the stationary base on a generally horizontal floor surface and to inhibit lateral movement of the stationary base relative to the floor surface, the seat being supported by and pivotally coupled to the stationary base to move between a seating position in which the sitting surface is at a generally horizontal sitting angle and a folded position in which the sitting surface is at a generally vertical folded angle; the seat back being supported by at least one of the mobile base and the stationary base; a base biasing member connected between the mobile base and the stationary base and biasing the stationary base in a generally upward direction relative to the mobile base, the biasing member providing a sufficient base biasing force to maintain the stationary support member at a vertical clearance distance above the floor surface when the mobile support member contacts the floor surface and the seat is in the folded position, so that the folding bench is supported on the floor surface by the mobile support member; an engagement member operatively connected to the seat and configured to lift the mobile base relative to the stationary base when the seat is moved from the folded position to the seating position so that the folding bench is supported on the floor surface by the stationary support member; and an actuation member operatively connected to the mobile base, the engagement member configured to contact the actuation member and to transmit a lifting force from the stationary base to the mobile base through the actuation member during movement of the seat from the folded position to the seating position; the method comprising moving a first one of the benches having a first seat in the folded position, having a first mobile base engaging a floor surface, to a position in which a first seat back surface of the first bench faces a first side of the table;

unfolding the first seat to the seating position to cause a first mobile base of the first bench to disengage from the floor surface and a first stationary base of the first bench to engage the floor surface;

moving a second one of the benches having a second seat in the folded position, having a second mobile base engaging a floor surface, to a position in which a second seat back surface of the second bench faces a second side of the table; and unfolding the second seat to the seating position to cause a second mobile base of the second bench to disengage from the floor surface and a second stationary base of the second bench to engage the floor surface.

19. The method of claim 18, further comprising engaging a retention mechanism of at least one of the first bench and the second bench when the respective seat is in the seating position, the retention mechanism resisting the respective base biasing force of the respective base biasing member to retain the respective seat in the seating position and the respective stationary frame in engagement with the floor surface.

\* \* \* \* \*